(12) United States Patent
Gaitonde et al.

(10) Patent No.: US 10,503,861 B1
(45) Date of Patent: Dec. 10, 2019

(54) PLACING AND ROUTING AN INTERFACE PORTION AND A MAIN PORTION OF A CIRCUIT DESIGN

(71) Applicant: Xilinx, Inc., San Jose, CA (US)

(72) Inventors: Dinesh D. Gaitonde, Fremont, CA (US); Henri Fraisse, Sunnyvale, CA (US); Sachin K. Bhutada, Hyderabad (IN); Aashish Tripathi, Hyderabad (IN); Ramakrishna K. Tanikella, Hyderabad (IN)

(73) Assignee: XILINX, INC., San Jose, CA (US)

( * ) Notice: Subject to any disclaimer, the term of this patent is extended or adjusted under 35 U.S.C. 154(b) by 26 days.

(21) Appl. No.: 15/984,870

(22) Filed: May 21, 2018

(51) Int. Cl.
  *G06F 17/50* (2006.01)
(52) U.S. Cl.
  CPC ........ *G06F 17/5072* (2013.01); *G06F 17/505* (2013.01); *G06F 17/5054* (2013.01); *G06F 17/5077* (2013.01)
(58) Field of Classification Search
  CPC .................................................. G06F 17/5072
  USPC .......................................................... 716/103
  See application file for complete search history.

(56) References Cited

U.S. PATENT DOCUMENTS

| | | | | |
|---|---|---|---|---|
| 6,526,554 B1* | 2/2003 | Katou | ................. | G06F 17/5022 716/101 |
| 6,757,874 B1* | 6/2004 | Dahl | .................... | G06F 17/5031 716/103 |
| 6,782,520 B1* | 8/2004 | Igusa | .................. | G06F 17/5072 716/114 |
| 6,829,757 B1* | 12/2004 | Teig | ..................... | G06F 17/5077 438/737 |
| 8,201,130 B1* | 6/2012 | Kalman | .............. | G06F 17/5077 716/126 |
| 8,375,345 B1* | 2/2013 | Barowski | ............ | G06F 17/5045 716/104 |

(Continued)

FOREIGN PATENT DOCUMENTS

WO    WO-0188767 A1 * 11/2001 ......... G06F 17/5072

OTHER PUBLICATIONS

Fraisse, Henri et al., "Boolean Satisfiability-Based Routing and its Application to Xilinx UltraScale Clock Network," Proc. of the 2016 ACM/SIGDA International Symposium on Field-Programmable Gate Arrays, Feb. 21, 2016, pp. 74-79, ACM. New York, New York, USA.

(Continued)

*Primary Examiner* — Suresh Memula
(74) *Attorney, Agent, or Firm* — LeRoy D. Maunu

(57) ABSTRACT

A netlist of a circuit design includes an interface portion and a main portion. The interface portion is decomposed into multiple levels. Each level specifies connections between a respective first set of circuit elements and a respective second set of circuit elements. The second set of circuit elements in each level, except a last level, includes the first set of circuit elements in a next level. The first set of circuit elements identified in a first level of the multiple levels have fixed locations. The second set of circuit elements in the multiple levels is placed-and-routed. The placing-and-routing of the second set of circuit elements in one level is completed before commencing placing-and-routing of the second set of circuit elements in the next level. The main portion is placed-and-routed after placing-and-routing the second set of circuit elements in the multiple levels.

20 Claims, 7 Drawing Sheets

(56) References Cited

U.S. PATENT DOCUMENTS

| | | | | |
|---|---|---|---|---|
| 8,566,765 | B1* | 10/2013 | Tzeng | G06F 17/5031 |
| | | | | 716/106 |
| 8,640,066 | B1* | 1/2014 | Gupta | G06F 17/505 |
| | | | | 716/102 |
| 9,613,173 | B1* | 4/2017 | Aggarwal | G06F 17/5054 |
| 10,331,841 | B1* | 6/2019 | Ginetti | G06F 17/5072 |
| 2002/0087940 | A1* | 7/2002 | Greidinger | G06F 17/5072 |
| | | | | 716/108 |
| 2006/0053396 | A1* | 3/2006 | Eng | G06F 17/5045 |
| | | | | 716/105 |
| 2009/0300570 | A1* | 12/2009 | Chan | G06F 17/5068 |
| | | | | 716/119 |
| 2013/0145329 | A1* | 6/2013 | Brandt | G06F 17/5068 |
| | | | | 716/104 |
| 2016/0344645 | A1* | 11/2016 | Zhang | H04L 45/28 |
| 2017/0011139 | A1* | 1/2017 | Arts | G06F 17/505 |

OTHER PUBLICATIONS

McMurchie, Larry et al., "PathFinder: A Negotiation-Based Performance-Driven Router for FPGAs," Proc. of the 3rd International ACM Symposium on Field-Programmable Gate Arrays, Feb. 12, 1995, pp. 1-7, IEEE, Piscataway, New Jersey, USA.

\* cited by examiner

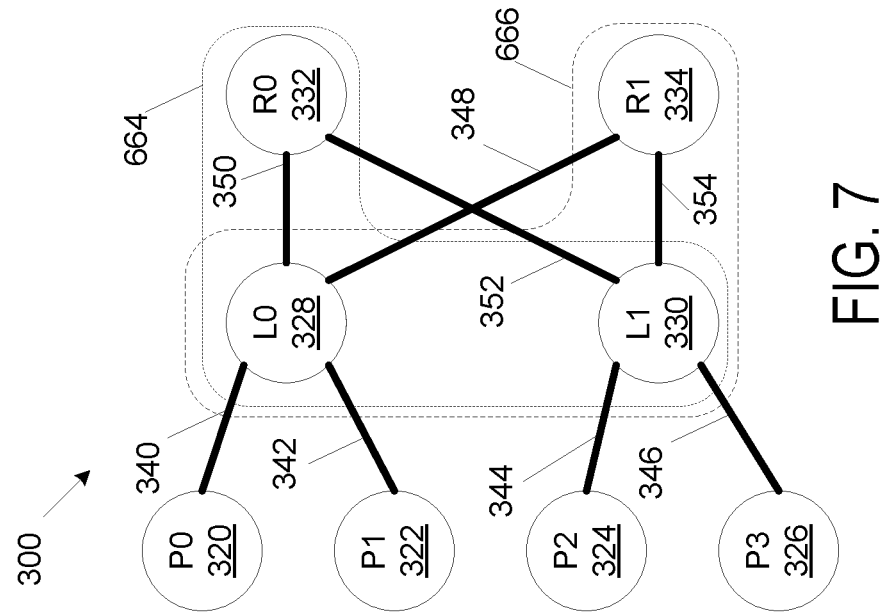
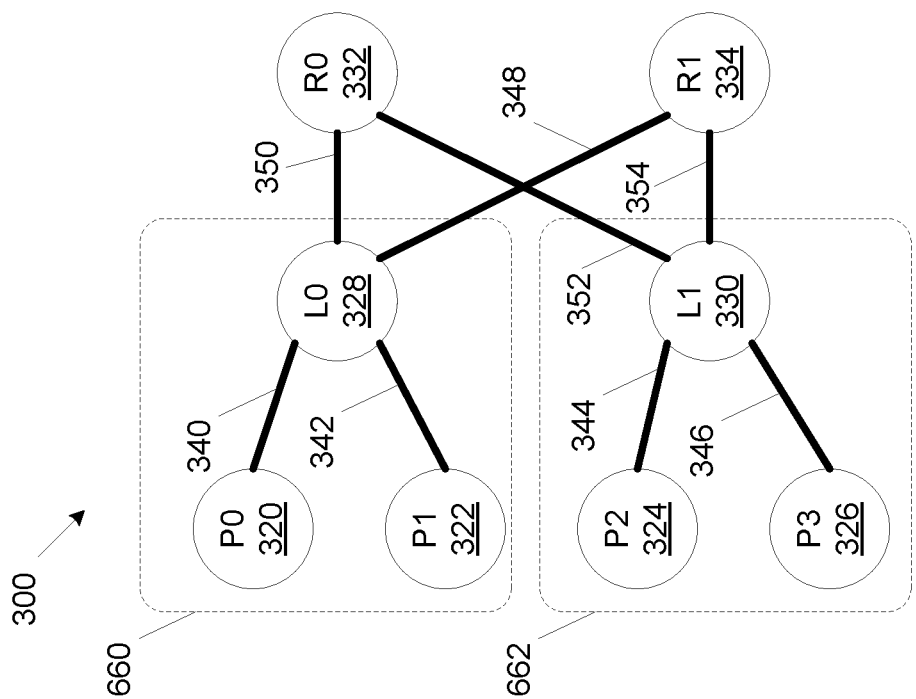

us 10,503,861 B1

PLACING AND ROUTING AN INTERFACE PORTION AND A MAIN PORTION OF A CIRCUIT DESIGN

TECHNICAL FIELD

The disclosure generally relates to placing and routing interface portions and main portions of integrated circuit designs.

BACKGROUND

Designing circuits, such as those implemented on field programmable gate arrays (FPGAs), can be a complex process. Meeting timing requirement(s) is one of the most challenging problems that circuit designers face, and can be even more challenging in an FPGA implementation when having to connect application-specific logic to hardwired components having fixed pin locations. Automated computer-aided design (CAD) implementation tools help circuit designers; however, automated place-and-route electronic design automation (EDA) solutions may be unable to resolve timing issues in the circuit design. As a result, circuit designers have to spend a lot of manual effort and time trying to close timing.

SUMMARY

A disclosed method includes inputting a netlist of a circuit design to a programmed computer. The netlist includes an interface portion and a main portion. The method includes decomposing, by the computer, the interface portion into multiple levels. Each level specifies connections between a respective first set of circuit elements and a respective second set of circuit elements. The respective second set of circuit elements in each level, except a last level, includes the respective first set of circuit elements in a next level. The respective first set of circuit elements identified in a first level of the multiple levels have fixed locations. The method includes placing-and-routing, by the computer, the respective second set of circuit elements in the multiple levels, including completing the placing-and-routing of the respective second set of circuit elements in one level before commencing placing-and-routing of the respective second set of circuit elements in the next level. The method includes placing-and-routing, by the computer, the main portion after placing-and-routing the respective second set of circuit elements in the multiple levels.

A disclosed system includes a computer system including a processor and a memory. The memory is configured with instructions that when executed by the processor cause the processor to perform operations including decomposing an interface portion of a circuit design into multiple levels. Each level specifies connections between a respective first set of circuit elements and a respective second set of circuit elements. The respective second set of circuit elements in each level, except a last level, includes the respective first set of circuit elements in a next level. The respective first set of circuit elements identified in a first level of the multiple levels have fixed locations. The operations include placing-and-routing the respective second set of circuit elements in the multiple levels by the computer, including completing the placing-and-routing of the respective second set of circuit elements in one level before commencing placing-and-routing of the respective second set of circuit elements in the next level. The operations include placing-and-routing a main portion of the circuit design by the computer after placing-and-routing the respective second set of circuit elements in the multiple levels.

Other features will be recognized from consideration of the Detailed Description and Claims, which follow.

BRIEF DESCRIPTION OF THE DRAWINGS

Various aspects and features of the method and system will become apparent upon review of the following detailed description and upon reference to the drawings in which:

FIGS. 6 and 7 illustrate a graphical representation of the exemplary netlist of FIG. 3 decomposed into multiple levels for placing-and-routing according to another approach;

DETAILED DESCRIPTION

Figure 1:
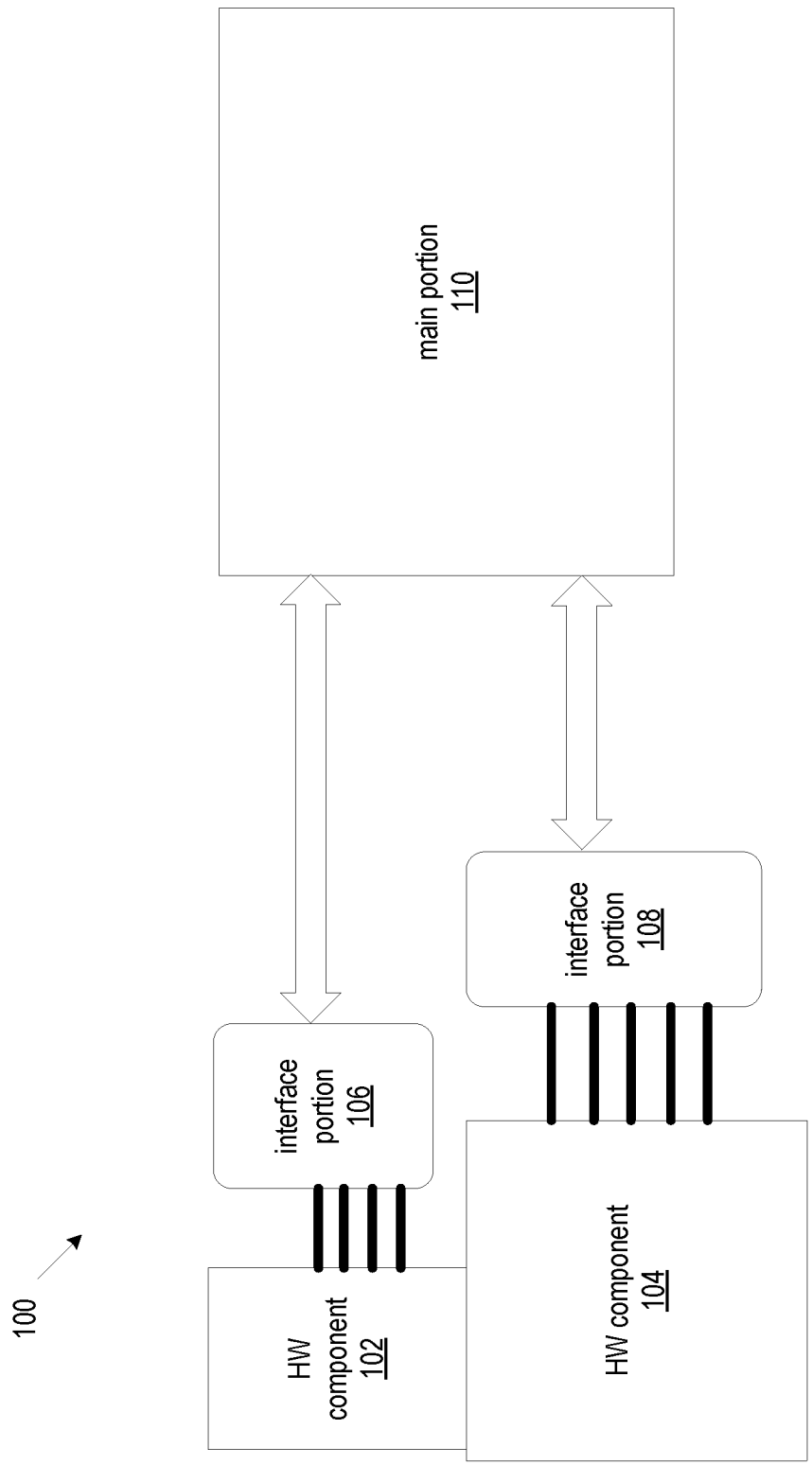
FIG. 1 illustrates a block diagram of a main portion and interface portions of a circuit design implemented on an integrated circuit (IC)

In the following description, numerous specific details are set forth to describe specific examples presented herein. It should be apparent, however, to one skilled in the art, that one or more other examples and/or variations of these examples may be practiced without all the specific details given below. In other instances, well known features have not been described in detail so as not to obscure the description of the examples herein. For ease of illustration, the same reference numerals may be used in different diagrams to refer to the same elements or additional instances of the same element.

A circuit design may include an interface portion, which is sometimes referred to as "soft" intellectual property (IP), and a main portion. The interface portion provides an interface between "hard" IP (e.g., hardwired logic component(s)) of an integrated circuit (IC) and the main portion and generally implements a particular protocol. Examples of hardwired logic components of the IC include, but are not limited to, microprocessors and input/output (I/O) circuitry such as Peripheral Component Interconnect Express (PCIe) blocks. The main portion of a circuit design refers to application-specific logic circuitry.

In some instances, the interface portion has strict timing requirements, which may be more aggressive than the timing requirements of the main portion. For example, an interface portion coupled to a PCIe block may operate at 500 megahertz (MHz), as required by the PCIe protocol, so that the timing requirements includes a maximum delay of 2 nanoseconds (ns). The main portion might have a less restrictive timing requirement of 200 MHz. Because the hardwired logic components have fixed pin locations for connecting to the interface portion, the options for placingand-routing circuit elements of the interface portion are limited. As a result, meeting timing requirements of an interface portion can be difficult.

In previous approaches, placing-and-routing is performed in two discrete steps. Although placing circuit elements may use routing estimates for guidance, all circuit elements of a circuit design, including elements of the main portion together with elements of the interface portion, are placed prior to routing connections to the placed circuit elements. Consequently, synergies between placing and routing are not used optimally, if at all. Due to the strict timing requirements of the interface portion, in previous approaches all the circuit elements of the interface portion are placed in a small area, which results in routing congestion. Previous approaches use iterative algorithms for routing that are not capable of meeting the strict timing requirements of an interface portion. For example, previous approaches route nets one-by-one in an order-dependent manner and the last nets to be routed are forced to use the remaining resources, which can require detours. The detours can increase the delays to the point that the delays exceed the timing requirements.

The disclosed approaches provide automated methods and systems that enable circuit designers to improve and/or close the timing of interface portions of circuit designs. The disclosed methods and systems optimize timing of circuit designs in an opportunistic manner by placing-and-routing the circuit elements of an interface portion before placing and routing the main portion and placing-and-routing the circuit elements of the interface portion in multiple levels. A netlist of a circuit design is input to a programmed computer, the netlist including an interface portion and a main portion. The computer decomposes the interface portion into multiple levels. Each level specifies connections between a respective first set of circuit elements and a respective second set of circuit elements. The circuit elements of the first set identified in a first level have fixed locations. For example, the first set of circuit elements can directly interface with a hardwired logic component. The first set of circuit elements can include one or more pins of a hardwired logic component from which signals are received by the interface portion. The second set of circuit elements in each level, except for the last level, includes the first set of circuit elements in a next level. The computer proceeds level by level, placing-and-routing the respective second set of circuit elements in each level. The respective second set of circuit elements in one level is placed-and-routed before commencing placing-and-routing the respective second set of circuit elements in the next level. The computer places-and-routes the main portion after the respective second set of circuit elements in the multiple levels are placed-and-routed.

In one approach, the actual timing of the respective first set of circuit elements is determined based on placement of and routing to the respective first set of circuit elements. The respective second set of circuit elements is then placed-and-routed based on the actual timing of the respective first set of circuit elements.

FIG. 1 illustrates a main portion and interface portions of a circuit design implemented on a programmable integrated circuit (IC). The programmable IC 100 includes hardwired logic ("HW") components 102 and 104. HW component 102 can be circuitry that implements I/O functions, for example. The HW components 102 and 104 have fixed pin locations for connecting to the interface portions 106 and 108. The interface portion 106 is coupled to HW component 102, and the interface portion 108 is coupled to HW component 104. The interface portions 106 and 108 serve as interfaces between the HW component 102 and HW component 104 and the main portion 110 of the circuit design. In at least one implementation, a timing requirement of the interface portion 106 and/or 108 is stricter than a timing requirement of the main portion 110. The communication protocol implemented by an interface portion can require the circuit elements of the interface portion to operate at, or within a small tolerance of, a specific frequency. The frequency designated by the communication protocol can be greater than the frequency specified for or achievable by the main portion. Although FIG. 1 shows two HW components and two interface portions, implementations in accordance with the present disclosure are not so limited. For example, more than one interface portion can interface a single HW component and more than one HW component can interface a single interface portion.

In previous approaches, the circuit elements of the interface portions 106 and 108 and the main portion 110 are placed prior to routing connections to the placed circuit elements. Because the interface portions 106 and 108 have stricter timing requirements than the main portion 110, in previous approaches all the circuit elements of the interface portions 106 and 108 are placed in a small area, which results in routing congestion. The iterative routing algorithms used by previous approaches are not capable of meeting the timing requirements of the interface portions 106 and 108 because the routing requires detours around other placed circuit elements, such as circuit elements of the main portion. The detours can increase delays in the placed-and-routed interface portions 106 and 108 to the point that the delays exceed the timing requirements of the interface portions 106 and 108.

In contrast, the disclosed approaches place-and-route the circuit elements of the interface portions 106 and 108 in multiple levels before placing and routing the main portion 110. The netlists of the interface portions 106 and 108 are decomposed into multiple levels, each level specifying connections between respective first and second sets of circuit elements. The circuit elements of the first set identified in the first level of the interface portions 106 and 108 include fixed pins of the HW components 102 and 104, respectively. The interface portions 106 and 108 are placed-and-routed level-by-level. The main portion 110 is placed-and-routed after the circuit elements of the interface portions 106 and 108 have been placed-and-routed.

Figure 8:
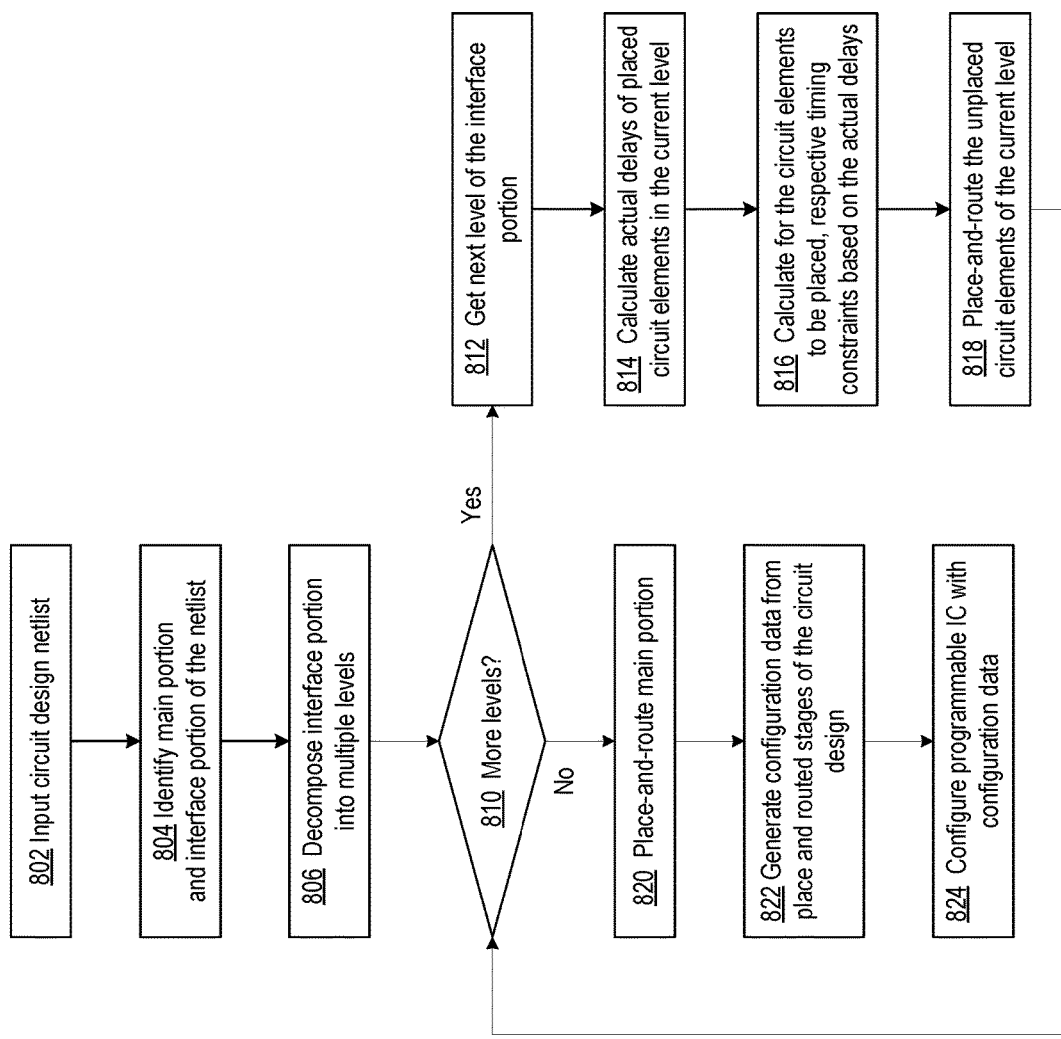
FIG. 8 illustrates a flowchart of an exemplary process for placing-and-routing a circuit design.

FIGS. 2-7 illustrate application of the disclosed approaches for placing and routing a circuit design to an exemplary interface portion, and FIG. 8 shows an exemplary process of placing and routing a circuit design.

Figure 2:
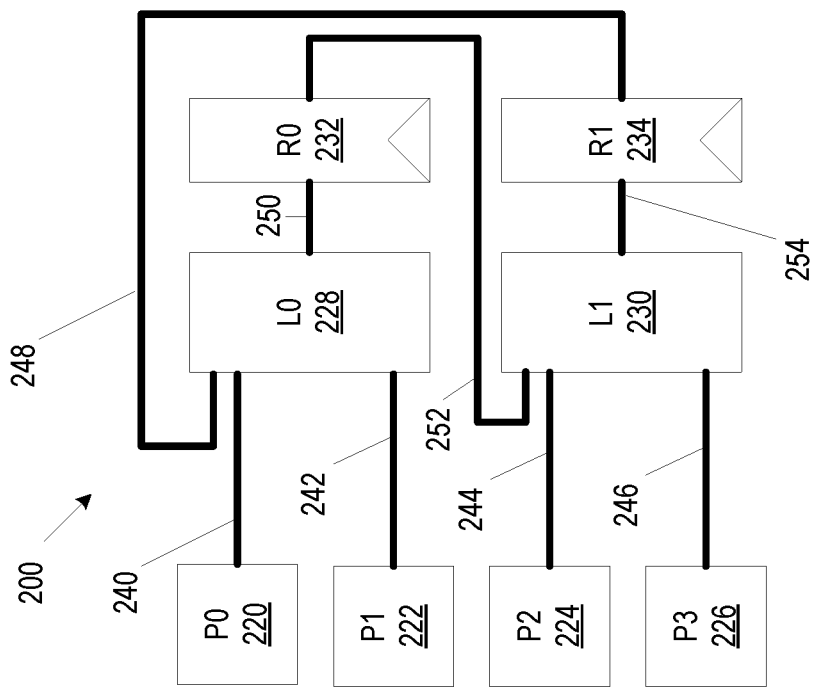
FIG. 2 illustrates a block diagram of a netlist of an exemplary interface portion of a circuit design.

FIG. 2 illustrates a block diagram of a netlist of an exemplary interface portion of a circuit design. The interface portion can be analogous to either of the interface portions 106 or 108 illustrated in FIG. 1. The netlist 200 includes logic block "L0" 228, logic block "L1" 230, register "R0" 232, and register "R1" 234. Logic block "L0" 228 is coupled to register "R0" 232 via signal path 250. Logic block "L1" 230 is coupled to register "R1" 234 via signal path 254. Register "R0" 232 is coupled to logic block "L1" 230 via signal path 252. Register "R1" 234 is coupled to logic block "L0" 228 via signal path 248. Logic block "L0" 228 is coupled to pin "P0" 220 of a hardware component of an IC, such as HW components 102 or 104 illustrated in FIG. 1, via signal path 240 and pin "P1" 222 of the hardware component via signal path 242. Logic block "L1" 230 is coupled to pin "P2" 224 of the hardware component via signal path 244 and pin "P3" 226 of the hardware component via signal path 246. A non-limiting example of a logic block is a look up table (LUT). A non-limiting example of a register is a bi-stable circuit.

Figure 3:
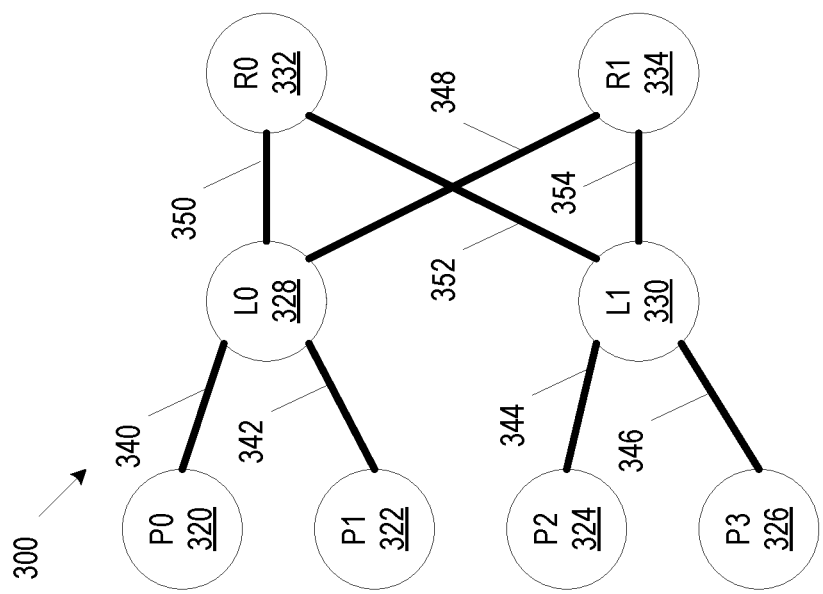
FIG. 3 illustrates a graphical representation of the exemplary netlist of FIG. 2.

FIG. 3 illustrates a graphical representation 300 of the exemplary netlist of FIG. 2. The graph 300 can be represented in the memory of a computer and includes vertices that correspond to circuit elements of the interface portion and the I/O pins of the HW component. The graph 300 includes edges that correspond to the connections (e.g., pin-to-pin connections) between the circuit elements. Vertices 320, 322, 324, and 326 correspond to the fixed locations of pin "P0" 220, pin "P1" 222, pin "P2" 224, and pin "P3" 226, respectively. Vertices 328, 330, 332, and 334 correspond to logic block "L0" 228, logic block "L1" 230, register "R0" 232, and register "R1" 234, respectively. Vertex 328 is connected to vertices 320, 322, 332, and 334 via edges 340, 342, 350, and 348, respectively. Vertex 330 is connected to vertices 324, 326, 332, and 334 via edges 344, 346, 352, and 354, respectively.

Figure 5:
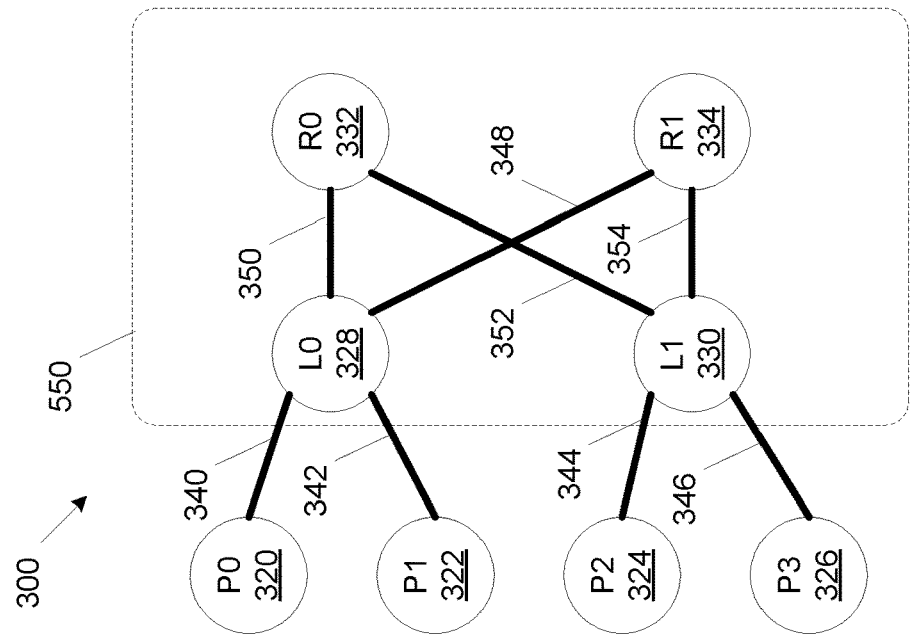
FIG. 5 illustrates a graphical representation of the exemplary netlist of FIG. 3 decomposed into a second level for placing-and-routing.
Figure 4:
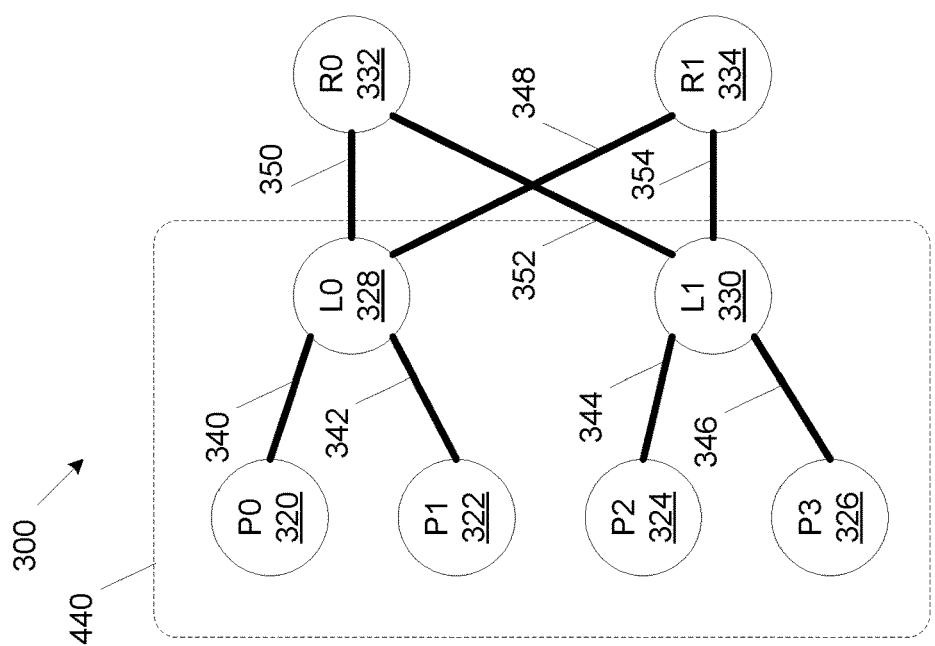
FIG. 4 illustrates a graphical representation of the exemplary netlist of FIG. 3 decomposed into a first level for placing-and-routing.

FIGS. 4 and 5 illustrate one approach in which the graph 300 is decomposed into multiple levels and the levels are successively placed and routed. Each level includes a first set of circuit elements and a second set of circuit elements. The first set of circuit elements are those whose positions are known, either by being at fixed positions or by having been placed in placing and routing a preceding level. The second set of circuit elements are those that are directly connected to the first set of circuit elements.

FIG. 4 illustrates a graphical representation 300 of the exemplary netlist of FIG. 3 decomposed into a first level 440 for placing-and-routing. In at least one implementation, the first level 440 includes fixed pin locations and circuit elements that directly connect to those fixed pin locations. The fixed pin locations are a "first set" of circuit elements of the first level, and the circuit element directly connected to those fixed pins are a "second set" of circuit elements of the first level. In the illustrated example, logic block "L0" 228 and logic block "L1" 230 (which are represented as vertices 328 and 330) interface with pins "P0-P3" 220, 222, 224, and 226, which are represented as vertices 320, 322, 324, and 326. Thus, the first level 440 includes vertices 320, 322, 324, 326, 328, and 330 and edges 340, 342, 344, and 346 as indicated by the dashed box. As pins P0 220, P1, 222, P2 224, and P3 226 have fixed positions, placing and routing is not required for those elements. Logic block "L0" 228 and logic block "L1" 230 are placed and then routed to the fixed pins "P0-P3" 220, 222, 224, and 226 in the first level 440.

After placing and routing the elements in the first level 440, circuit elements of the next level can be placed and routed. In placing and routing each level, elements that were placed and routed in a preceding level need not be placed and routed in placing and routing the current level. FIG. 5 illustrates a graphical representation of the exemplary netlist of FIG. 3 decomposed into a second level 550 for placing-and-routing. Register "R0" 232 and register "R1" 234 (which are represented as vertices 332 and 334) are connected to logic block "L0" 228 and logic block "L1" 230 (which are represented as vertices 328 and 330). Thus, the second level 550 includes vertices 328, 330, 332, and 334 and edges 350, 352, 348, and 354 as indicated by the dashed box. After having placed and routed logic block "L0" 228 and logic block "L1" 230 in placing and routing the first level 440, register "R0" 232 and register "R1" 234 are placed and then routed to logic block "L0" 228 and logic block "L1" 230 in placing and routing the second level 550. Logic block "L0" 228 and logic block "L1" 230 are the first set of circuit elements of the second level 550 and were placed and routed during placing and routing of the first level. Register "R0" 232 and register "R1" 234 are the second set of circuit elements of the second level 550.

Because logic block "L0" 228 and logic block "L1" 230 are placed-and-routed in the first level 440 before register "R0" 232 and register "R1" 234 are placed-and-routed in the second level 550, the actual timing of logic block "L0" 228 and logic block "L1" 230 can be calculated prior to placing-and-routing register "R0" 232 and register "R1" 234. The actual timing of logic block "L0" 228 and logic block "L1" 230 is based on the placements of logic block "L0" 228 and logic block "L1" 230 and routing of logic block "L0" 228 and logic block "L1" 230 to the fixed I/O pins "10-13" 220, 222, 224, and 226. The placement of register "R0" 232 and register "R1" 234 and routing of register "R0" 232 and register "R1" 234 to logic block "L0" 228 and logic block "L1" 230 are based on the actual timing of logic block "L0" 228 and logic block "L1" 230.

In at least one implementation, the timing of circuit elements placed-and-routed in the second level can be relaxed based on the actual timing of circuit elements placed-and-routed in the first level. For example, assume that the netlist 200 is associated with a timing requirement of 500 MHz so that the maximum allowable delay is 2 ns. After logic block "L0" 228 and logic block "L1" 230 are placed-and-routed in the first level, the actual delays been the pins "P0-P3" 220, 222, 224, and 226 and logic block "L0" 228 and logic block "L1" 230 can be calculated. In this example, the actual delay on signal path 240 between pin "P0" 220 and logic block "L0" 228 is 500 picoseconds (ps); the actual delay on signal path 242 between pin "P1" 222 and logic block "L0" 228 is 600 ps; the actual delay on signal path 244 between pin "P2" 224 and logic block "L1" 230 is 700 ps; and the actual delay on signal path 246 between pin "P3" 226 and logic block "L1" 230 is 800 ps. Based on the actual delays, it is known that register "R0" 232 and register "R1" 234 can be placed-and-routed so that signal path 250 has a maximum delay of 1400 ps and so that signal path 254 has a maximum delay of 200 ps. Previous placing-and-routing approaches do not have the flexibility to relax timing requirements because the entire circuit design is placed before connections are routed. As a result, previous approaches do not know what resources of an IC are consumed by placing-and-routing the interface portion until the entire circuit design has been placed-and-routed.

FIGS. 6 and 7 illustrate a graphical representation 300 of the exemplary netlist of FIG. 3 decomposed into multiple levels 660, 662, 664, and 666 for placing-and-routing according to another approach. In at least one implementation, a netlist can be decomposed so that a respective second set of circuit elements of a level does not include circuit elements that are directly connected to one another. If the circuit elements are not directly connected, then the placement of one circuit element does not affect the timing of other circuit elements. As a result, each circuit element of the second set can be placed-and-routed independently from one another.

As illustrated in FIGS. 6 and 7, the netlist can be decomposed into multiple levels 660, 662, 664, and 666 so that the second set of circuit elements of each level includes a single circuit element. For example, the first level 660 includes placing logic block "L0" 228 and routing pins "P0" 220 and "P1" 222 to logic block "L0" 228. The second level 662 includes placing logic block "L0" 230 and routing pins "P3" 224 and "P4" 226 to logic block "L0" 230. The third level 664 includes placing register "R0" 232 and routing the placed logic blocks "L0" 228 and "L1" 230 to register "R0"

232. The fourth level 666 includes placing register "R1" 234 and routing the placed logic blocks "L0" 228 and "L1" 230 to register "R1" 234. The order of placing-and-routing is not limited to the first level 660, the second level 662, the third level 664, and then the fourth level 666. For example, the order of placing-and-routing can be the first level 660, the third level 664, the second level 662, and then the fourth level 666.

FIG. 8 illustrates a flowchart of an exemplary process for placing-and-routing a circuit design. At block 802, a netlist of a circuit design is input to an electronic design automation (EDA) tool executing on a computer system. At block 804, the system identifies a main portion of the netlist and an interface portion of the netlist. The interface portion can be identified based on circuit elements of the circuit design being associated with a communication protocol, for example. The interface portion can also be identified based on a timing requirement of a first portion of the netlist being stricter than a timing requirement of a second portion of the netlist.

At block 806, the system generates a graphical representation of the netlist and decomposes the interface portion represented in the graph into multiple levels. The graphical representation includes a plurality of vertices corresponding to the circuit elements of the interface portion and a plurality of edges that connect the plurality of vertices. The edges correspond to pin-to-pin connections between the circuit elements of the interface portion. Each level is a subgraph of the overall graph and is a bipartite graph. In identifying the first level, the system associates first vertices with circuit elements having fixed locations and associates second vertices with the circuit elements of the interface portion having edges directly connected to the first vertices. In each successive level, the first vertices of the succeeding level include one or more vertices of the previous level.

Decision block 810 controls processing in which the levels are placed and routed in succession. At decision block 810, the system determines whether there are more levels to process. If the system determines that there is at least one more level, then at block 812, the system gets the next level of the interface portion of the netlist.

At block 814, the system calculates the actual delays of the placed and routed circuit elements in the current level. At block 816, the system calculates, for the circuit elements of the current level to be placed, respective timing constraints based on the actual delays.

At block 818, the system places-and-routes the unplaced circuit elements of the current level. The system places-and-routes the unplaced circuit elements by executing any place-and-route algorithm including, but not limited to, a Boolean satisfiability (SAT) based algorithm or an integer linear programming (ILP) based algorithm.

At decision block 810, if the system determines that there are no more levels in the netlist, then at block 820, the system places-and-routes the main portion of the netlist. At block 822, the system generates configuration data from the placed-and-routed levels of the interface portion and the placed-and-routed main portion. At block 824, the system configures a programmable IC with the configuration data.

Figure 9:
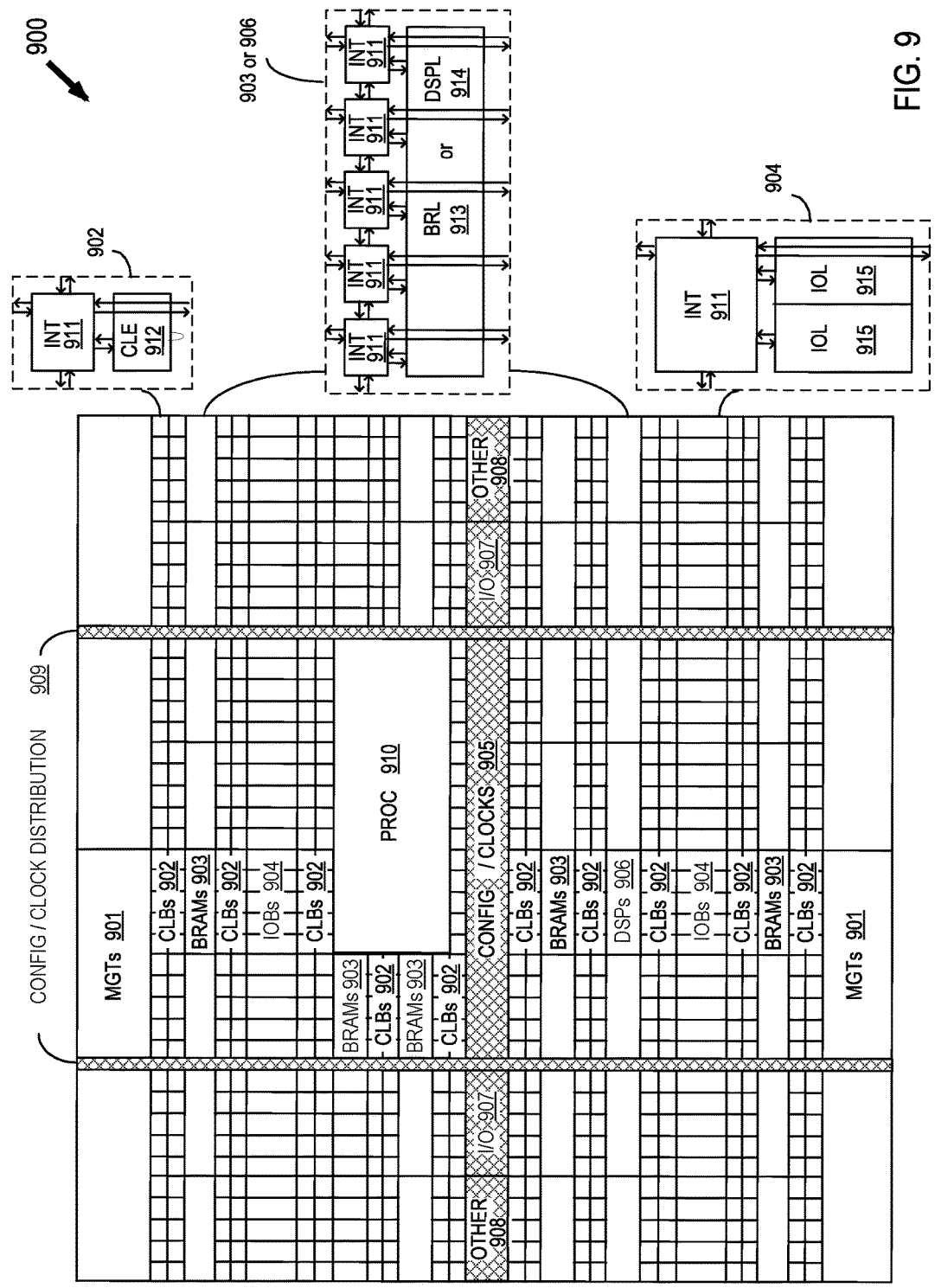
FIG. 9 illustrates an FPGA implementation of a programmable integrated circuit (IC)

FIG. 9 illustrates a programmable integrated circuit (IC) 900 on which a circuit design processed according to the disclosed methods and systems can be implemented. The programmable IC may also be referred to as a System On Chip (SOC) that includes field programmable gate array logic (FPGA) along with other programmable resources. FPGA logic may include several different types of programmable logic blocks in the array. For example, FIG. 9 illustrates programmable IC 900 that includes a large number of different programmable tiles including multi-gigabit transceivers (MGTs) 901, configurable logic blocks (CLBs) 902, random access memory blocks (BRAMs) 903, input/output blocks (IOBs) 904, configuration and clocking logic (CONFIG/CLOCKS) 905, digital signal processing blocks (DSPs) 906, specialized input/output blocks (I/O) 907, for example, clock ports, and other programmable logic 908 such as digital clock managers, analog-to-digital converters, system monitoring logic, and so forth. Some programmable IC having FPGA logic also include dedicated processor blocks (PROC) 910 and internal and external reconfiguration ports (not shown).

In some FPGA logic, each programmable tile includes a programmable interconnect element (INT) 911 having standardized connections to and from a corresponding interconnect element in each adjacent tile. Therefore, the programmable interconnect elements taken together implement the programmable interconnect structure for the illustrated FPGA logic. The programmable interconnect element INT 911 also includes the connections to and from the programmable logic element within the same tile, as shown by the examples included at the top of FIG. 9.

For example, a CLB 902 can include a configurable logic element (CLE) 912 that can be programmed to implement user logic, plus a single INT 911. A BRAM 903 can include a BRAM logic element (BRL) 913 in addition to one or more programmable interconnect elements. Typically, the number of interconnect elements included in a tile depends on the height of the tile. In the pictured programmable IC, a BRAM tile has the same height as five CLBs, but other numbers (e.g., four) can also be used. A DSP tile 906 can include a DSP logic element (DSPL) 914 in addition to an appropriate number of programmable interconnect elements. An 10B 904 can include, for example, two instances of an input/output logic element (IOL) 915 in addition to one instance of the INT 911. As will be clear to those of skill in the art, the actual I/O bond pads connected, for example, to the IOL 915, are manufactured using metal layered above the various illustrated logic blocks, and typically are not confined to the area of the input/output logic element 915.

In the pictured programmable IC, a columnar area near the center of the die (shown shaded in FIG. 9) is used for configuration, clock, and other control logic. Horizontal areas 909 extending from this column are used to distribute the clocks and configuration signals across the breadth of the programmable IC. Note that the references to "columnar" and "horizontal" areas are relative to viewing the drawing in a portrait orientation.

Some programmable ICs utilizing the architecture illustrated in FIG. 9 include additional logic blocks that disrupt the regular columnar structure making up a large part of the programmable IC. The additional logic blocks can be programmable blocks and/or dedicated logic. For example, the processor block PROC 910 shown in FIG. 9 spans several columns of CLBs and BRAMs.

Note that FIG. 9 is intended to illustrate only an exemplary programmable IC architecture. The numbers of logic blocks in a column, the relative widths of the columns, the number and order of columns, the types of logic blocks included in the columns, the relative sizes of the logic blocks, and the interconnect/logic implementations included at the top of FIG. 9 are purely exemplary. For example, in an actual programmable IC, more than one adjacent column of CLBs is typically included wherever the CLBs appear, to facilitate the efficient implementation of user logic.

Figure 10:
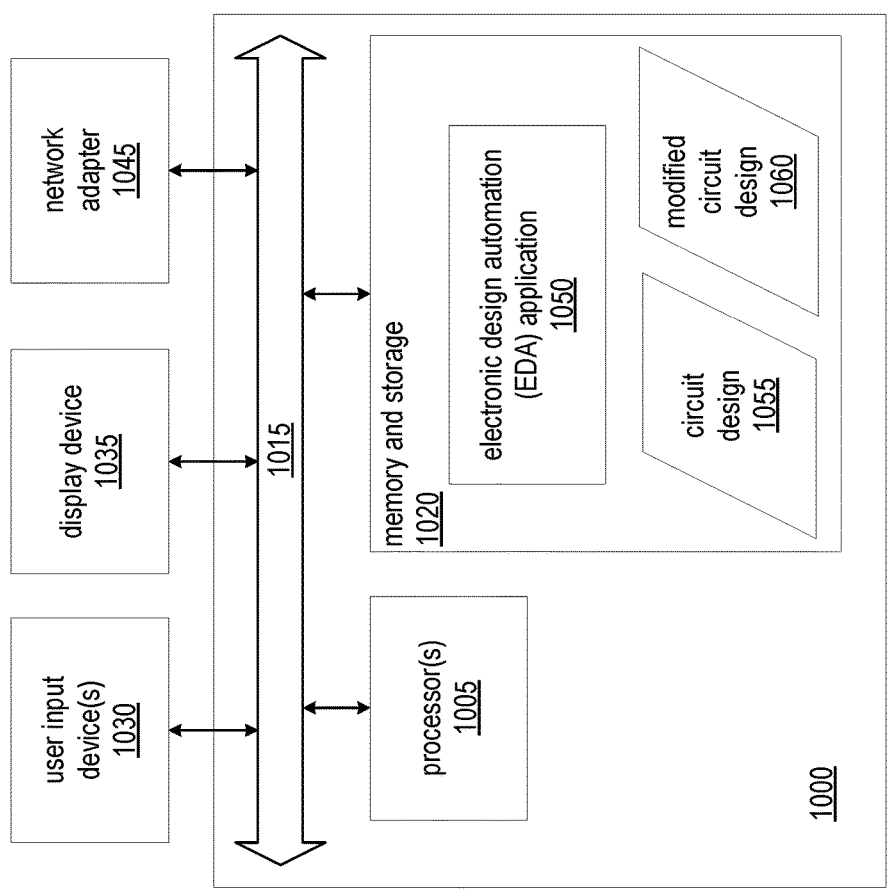
FIG. 10 illustrates a block diagram illustrating an exemplary data processing system.

FIG. 10 illustrates a block diagram illustrating an exemplary data processing system (system) 1000. System 1000 is an example of an EDA system. As pictured, system 1000 includes at least one processor circuit (or "processor"), e.g., a central processing unit (CPU) 1005, coupled to memory and storage arrangement 1020 through a system bus 1015 or other suitable circuitry. System 1000 stores program code and circuit design 1055 within memory and storage arrangement 1020. Processor 1005 executes the program code accessed from the memory and storage arrangement 1020 via system bus 1015. In one aspect, system 1000 is implemented as a computer or other data processing system that is suitable for storing and/or executing program code. It should be appreciated, however, that system 1000 can be implemented in the form of any system including a processor and memory that is capable of performing the functions described within this disclosure.

Memory and storage arrangement 1020 includes one or more physical memory devices such as, for example, a local memory (not shown) and a persistent storage device (not shown). Local memory refers to random access memory or other non-persistent memory device(s) generally used during actual execution of the program code. Persistent storage can be implemented as a hard disk drive (HDD), a solid state drive (SSD), or other persistent data storage device. System 1000 may also include one or more cache memories (not shown) that provide temporary storage of at least some program code and data in order to reduce the number of times program code and data must be retrieved from local memory and persistent storage during execution.

Input/output (I/O) devices such as user input device(s) 1030 and a display device 1035 may be optionally coupled to system 1000. The I/O devices may be coupled to system 1000 either directly or through intervening I/O controllers. A network adapter 1045 also can be coupled to system 1000 in order to couple system 1000 to other systems, computer systems, remote printers, and/or remote storage devices through intervening private or public networks. Modems, cable modems, Ethernet cards, and wireless transceivers are examples of different types of network adapter 1045 that can be used with system 1000.

Memory and storage arrangement 1020 may store an EDA application 1050. EDA application 1050, being implemented in the form of executable program code, is executed by processor(s) 1005. As such, EDA application 1050 is considered part of system 1000. System 1000, while executing EDA application 1050, receives and operates on circuit design 1055. In one aspect, system 1000 performs a design flow on circuit design 1055, and the design flow may include synthesis, mapping, placement, routing, and the application of the methods described herein. System 1000 generates an optimized, or modified, version of circuit design 1055 as circuit design 1060. The netlist(s) of interface portion(s) of circuit design 1055 have not been decomposed into multiple levels and the circuit design 1055 has not been placed-and-routed. Circuit design 1060 includes placed-and-routed levels of the netlist(s) of the interface portion(s) and placed-and-routed main portion of circuit design 1055.

EDA application 1050, circuit design 1055, circuit design 1060, and any data items used, generated, and/or operated upon by EDA application 1050 are functional data structures that impart functionality when employed as part of system 1000 or when such elements, including derivations and/or modifications thereof, are loaded into an IC such as a programmable IC causing implementation and/or configuration of a circuit design within the programmable IC.

Though aspects and features may in some cases be described in individual figures, it will be appreciated that features from one figure can be combined with features of another figure even though the combination is not explicitly shown or explicitly described as a combination.

The disclosed methods and system are thought to be applicable to a variety of systems for preparing and/or maintaining circuit designs. Other aspects and features will be apparent to those skilled in the art from consideration of the specification. It is intended that the specification and drawings be considered as examples only, with a true scope of the invention being indicated by the following claims.

What is claimed is:

1. A method, comprising:
    inputting a netlist of a circuit design to a programmed computer, the netlist including an interface portion and a main portion;
    decomposing, by the computer, the interface portion into multiple levels, wherein:
        each level specifies connections between a respective first set of circuit elements and a respective second set of circuit elements,
        the respective second set of circuit elements in each level, except a last level, includes the respective first set of circuit elements in a next level, and
        the respective first set of circuit elements identified in a first level of the multiple levels have fixed locations;
    placing-and-routing, by the computer, the respective second set of circuit elements in the multiple levels, including completing the placing-and-routing of the respective second set of circuit elements in one level before commencing placing-and-routing of the respective second set of circuit elements in the next level; and
    placing-and-routing, by the computer, the main portion after placing-and-routing the respective second set of circuit elements in the multiple levels.

2. The method of claim 1, wherein the respective second set of circuit elements in each level includes circuit elements of the circuit design that are not directly connected to one another.

3. The method of claim 2, wherein the placing-and-routing the respective second set of circuit elements includes placing-and-routing a single circuit element.

4. The method of claim 1, wherein the placing-and-routing the respective second set of circuit elements includes placing-and-routing to only the respective second set of circuit elements.

5. The method of claim 1, wherein the placing-and-routing the respective second set of circuit elements includes:
    determining actual timing of the respective first set of circuit elements based on placement of and routing to the respective first set of circuit elements; and
    placing-and-routing the respective second set of circuit elements based on the actual timing of the respective first set of circuit elements.

6. The method of claim 5, wherein:
    the determining the actual timing includes:
        determining respective actual delays to the respective first set of circuit elements based on placement of and routing to the respective first set of circuit elements, and
        for each connection from each circuit element of the first set to a circuit element of the second set, determining a respective timing constraint based on the respective actual delay; and the placing-and-routing each circuit element of the respective second set is based on the respective timing constraint of each connection to the circuit element.

7. The method of claim 1, further comprising identifying, by the computer, the interface portion of the netlist by the computer based on circuit elements of the circuit design being associated with a communication protocol.

8. The method of claim 1, further comprising identifying, by the computer, the interface portion of the netlist by the computer based on a timing requirement of a first portion of the netlist being more strict than a timing requirement of a second portion of the netlist.

9. The method of claim 1, wherein decomposing the interface portion includes:
generating a graphical representation of the netlist, the graphical representation including a plurality of vertices corresponding to the circuit elements of the interface portion and a plurality of edges that connect the plurality of vertices and correspond to pin-to-pin connections between the circuit elements of the interface portion;
assigning first vertices corresponding to circuit elements having fixed locations and vertices corresponding to the circuit elements of the interface portion having edges connected to the first level; and
segmenting the plurality of vertices and plurality of edges other than vertices and edges assigned to the first level into respective bipartite graphs.

10. The method of claim 1, wherein the placing-and-routing the respective second set of circuit elements includes executing a Boolean satisfiability (SAT) based algorithm or an integer linear programming (ILP) based algorithm.

11. The method of claim 1, further comprising:
generating, by the computer, configuration data from placed-and-routed circuit elements of the interface portion and placed-and-routed circuit elements of the main portion; and
configuring, by the computer, a programmable integrated circuit (IC) with the configuration data.

12. A system, comprising:
a computer system including:
a processor; and
a memory configured with instructions that when executed by the processor cause the processor to perform operations including:
decomposing an interface portion of a circuit design into multiple levels, wherein:
each level specifies connections between a respective first set of circuit elements and a respective second set of circuit elements,
the respective second set of circuit elements in each level, except a last level, includes the respective first set of circuit elements in a next level, and
the respective first set of circuit elements identified in a first level of the multiple levels have fixed locations;
placing-and-routing the respective second set of circuit elements in the multiple levels by the computer, including completing the placing-and-routing of the respective second set of circuit elements in one level before commencing placing-and-routing of the respective second set of circuit elements in the next level; and
placing-and-routing a main portion of the circuit design by the computer after placing-and-routing the respective second set of circuit elements in the multiple levels.

13. The system of claim 12, wherein the respective second set of circuit elements in each level includes circuit elements of the circuit design that are not directly connected to one another.

14. The system of claim 12, wherein the placing-and-routing the respective second set of circuit elements includes placing-and-routing a single circuit element.

15. The system of claim 12, wherein the placing-and-routing the respective second set of circuit elements includes placing-and-routing to only the respective second set of circuit elements.

16. The system of claim 12, wherein the placing-and-routing the respective second set of circuit elements includes:
determining respective actual delays to the respective first set of circuit elements based on placement of and routing to the respective first set of circuit elements;
for each connection from each circuit element of the first set to a circuit element of the second set, determining a respective timing constraint based on the respective actual delay; and
placing-and-routing each circuit element of the respective second set of circuit elements based on the respective timing constraint of each connection to the circuit element.

17. The system of claim 12, wherein the memory is configured with instructions that when executed by the processor cause the processor to perform operations including:
identifying the interface portion of the netlist by the computer based on circuit elements of the circuit design being associated with a communication protocol.

18. The system of claim 12, wherein the memory is configured with instructions that when executed by the processor cause the processor to perform operations including:
identifying the interface portion of the netlist by the computer based on a timing requirement of a first portion of the netlist being more strict than a timing requirement of a second portion of the netlist.

19. The system of claim 12, wherein decomposing the interface portion includes:
generating a graphical representation of the netlist, the graphical representation including a plurality of vertices corresponding to the circuit elements of the interface portion and a plurality of edges that connect the plurality of vertices and correspond to pin-to-pin connections between the circuit elements of the interface portion;
assigning first vertices corresponding to circuit elements having fixed locations and vertices corresponding to the circuit elements of the interface portion having edges connected to the first level; and
segmenting the plurality of vertices and plurality of edges other than vertices and edges assigned to the first level into respective bipartite graphs.

20. The system of claim 12, wherein the memory is configured with instructions that when executed by the processor cause the processor to perform operations including:
generating configuration data from placed-and-routed circuit elements of the interface portion and placed-and-routed circuit elements of the main portion; and configuring a programmable integrated circuit (IC) with the configuration data.

* * * * *